Patented Aug. 28, 1945

2,383,815

UNITED STATES PATENT OFFICE 2,383,815

TERNARY SYNERGISTIC ANTIOXIDANT COMPOSITION

Roy W. Riemenschneider, Glenside, and Jack Turer, Philadelphia, Pa., assignors to Claude R. Wickard, as Secretary of Agriculture of the United States of America, and his successors in office No Drawing. Application April 24, 1943, Serial No. 484,346

10 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to antioxidant compositions, and more particularly to rancidity inhibitors for oleaginous materials.

To inhibit oxidative rancidity, the objectionable odor and flavor imparted to fats and oils by the action of atmospheric oxygen, it is common practice to incorporate various antioxidants or rancidity-inhibiting agents with oleaginous materials.

Wells and Riemenschneider have shown in their application for patent, Serial No. 472,280, filed January 13, 1943, that ascorbyl monoesters of fat acids are fat-soluble substances having excellent rancidity-inhibiting properties.

We have found that synergistic antioxidant action results when ascorbyl monoesters of fat acids are used in conjunction with alpha-tocopherol (vitamin E) or its isomers or analogues, and phospholipids, for example, soybean phospholipids (commercial lecithin).

The term "ascorbyl monoesters of fat acids," as used herein, is defined as the monoesters of saturated aliphatic monocarboxylic acids containing 12 to 18 carbon atoms per molecule with compounds of the ascorbic acid series having the general formula:

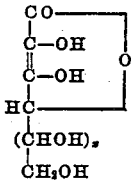

where $x$ is 0 or a whole number not exceeding 3. Thus, the term "ascorbyl monoesters of fat acids" is meant to include such compounds as lauryl, myristyl, palmityl, stearyl, monoesters of d- and l-ascorbic and of d- and l-isoascorbic acids, or of other compounds of the ascorbic acid series, used either singly or in combination.

Ascorbyl monoesters of fat acids are obtainable by the interaction of aliphatic monocarboxylic acids with compounds of the ascorbic acid series in the presence of concentrated sulfuric acid, as described by Wells and Swern in their applications for patent, Serial Nos. 442,557 and 442,558, filed May 11, 1942. According to the methods disclosed in these applications, the monocarboxylic acid and the compound of the ascorbic acid series are dissolved in concentrated sulfuric acid and the mixture is maintained at a suitable temperature, preferably at ordinary room temperature, for a length of time necessary to effect esterification, which usually requires 16 to 20 hours. The monoester is then isolated from the sulfuric acid solution by any suitable procedure; for instance, by dilution with water followed by solvent extraction.

The method of preparing these monoesters is further illustrated by the following examples:

Example I l-Ascorbyl palmitate, the palmitic acid monoester of l-ascorbic acid, is prepared by dissolving 8.8 grams of l-ascorbic acid and 10.3 grams of palmitic acid in 100 cc. of 95 percent sulfuric acid at essentially room temperature. The solution is allowed to stand for about 16 hours after which the reaction mixture is poured slowly and with vigorous stirring into about 500 grams of chopped ice. The stirring is continued until the oily phase of the mixture has solidified. The mixture is then extracted with ethyl ether and the ether extract is washed with water until the washings are substantially free of mineral acid. The ether extract is then dried and evaporated to dryness and the residue remaining is powdered and washed by decantation with 200 to 300 cc. of petroleum ether (boiling range 35° to 60° C.), thereby removing unreacted palmitic acid from the reaction product. The white solid residue is insoluble in petroleum ether and consists essentially of ascorbyl monopalmitate. The yield is good.

Example II 8.8 grams of d-isoascorbic acid are esterified with 10.3 grams of palmitic acid in 100 cc. of 95 percent sulfuric acid by the procedure described in Example I. The reaction product after removal of unreacted palmitic acid consists essentially of d-isoascorbyl monopalmitate. The yield is good.

The use of the ternary antioxidant compositions of this invention results in a substantial increase in the stability of fatty materials against oxidative rancidity. We have also found that synergistic antioxidant action occurs when alpha-tocopherol is used with ascorbyl monoester of fat acids and when phospholipids are used with acidic rancidity inhibitors. However, the increase in stability attained by the use of the antioxidant compositions of this invention is much greater than the additive effect of the components used singly or in combination with only one of the other components.

The synergistic antioxidant effect of alpha-tocopherol when combined with ascorbyl monoesters of fat acids and of phospholipids when used in conjunction with acidic rancidity inhibitors is the subject of copending applications for patent Serial No. 479,686, filed March 19, 1943, and Serial No. 484,347, filed April 24, 1943.

The effect of the ternary antioxidant composition is shown by the following tabulation of experimental data, wherein the stability of the tested materials is indicated by the length of time required to attain a peroxide content equal to 20 milli-equivalents per kilogram of the fatty substrate. The stability of the tested materials was determined by the Swift stability test, also known as the active oxygen method, in which air is bubbled at a uniform and predetermined rate through samples of the fatty material maintained at 100° C. At regular intervals the samples are tested for peroxide content by determining the amount of free iodine liberated from potassium iodide by the peroxide-like oxidation products found in the fatty material.

*Table I*

| Substrate | Rancidity-inhibiting agents added | | | | Stability |
|---|---|---|---|---|---|
| | Alpha-tocopherol | Soybean phospholipids | Ascorbyl monoester | | |
| | | | Monoester used | Amount used | |
| | Per cent | Per cent | | Per cent | Hours |
| Prime steam lard. | | | | | 4 |
| | 0.001 | | | | 4½ |
| | | 0.03 | | | 7½ |
| | | | d-Isoascorbyl stearate. | 0.06 | 4½ |
| | 0.001 | 0.03 | | | 10½ |
| | 0.001 | | do | 0.06 | 7 |
| | | 0.03 | do | 0.06 | 26 |
| | 0.001 | 0.03 | do | 0.06 | 39¾ |
| | | | do | 0.12 | 6½ |
| | 0.001 | 0.03 | do | 0.12 | 60 |

We have further found that vegetable oils may be used as a source of tocopherols, phospholipids and other antioxidants capable of acting in a synergistic manner with ascorbyl monoesters of fat acids. Thus, we have found that of a large number of vegetable oils examined, only avocado oil failed to exert some antioxidant effect upon lard. This is shown by the following tabulation of experimental results:

*Table II*

| Substrate | Inhibitor added | Concentration of inhibitor | Swift stability | Antioxidant effect |
|---|---|---|---|---|
| | | Per cent | Hours | Hours |
| | (Control) None | | 3 | |
| Lard (F-2) | Appleseed oil (crude pressed). | 1.0 | 6 | 3 |
| | Tomato seed oil (crude pressed). | 1.0 | 7 | 4 |
| | Cocoa butter | 1.0 | 4 | 1 |
| | Wheat germ oil | 1.0 | 12½ | 9½ |
| | Peanut oil (crude) | 1.0 | 4½ | 1½ |
| | Peanut oil (alkali refined). | 1.0 | 3½ | ½ |
| | Avocado oil | 1.0 | 1½ | 1½ |
| | Orange seed oil (crude pressed). | 1.0 | 3½ | ½ |
| | Sunflower seed oil (crude pressed). | 1.0 | 4 | 1 |
| | Walnut oil (crude pressed). | 1.0 | 4 | 1½ |
| | Grapeseed oil (crude pressed). | 1.0 | 4 | 1½ |
| | Safflower oil (crude pressed). | 1.0 | 4½ | 1½ |
| | Soybean oil (refined and deodorized). | 1.0 | 5 | 2 |

Moreover, our results differ from those of previous investigators in that we find that vegetable oils are effective in stabilizing lard against rancidity regardless of the refining treatment to which the oils have been subjected. This is illustrated by the following data on the use of cottonseed oil and corn oil:

*Table III*

| Substrate | Inhibitor added | Concentration of inhibitor | Swift stability | Antioxidant effect |
|---|---|---|---|---|
| | | Percent | Hours | Hours |
| Lard (F-1) | | | 4 | |
| | Cottonseed oil (alkali refined). | 5 | 13 | 9 |
| | Cottonseed oil (hydrogenated). | 5 | 15 | 11 |
| Lard (V-2) | | | 3 | |
| | Corn oil (crude) | 1 | 8 | 5 |
| | Corn oil (alkali-refined) | 1 | 7 | 4 |
| | Corn oil (refined and deodorized). | 1 | 6 | 3 |
| | Corn oil (refined, hydrogenated and deodorized). | 1 | 7 | 4 |

The following examples show the synergistic antioxidant action of vegetable oils when used with ascorbyl monoesters of fat acids:

*Example I*

| Sample tested | Swift stability | Increase of stability |
|---|---|---|
| | Hours | Hours |
| Original lard | 6 | |
| Lard+1% apple seed oil (crude) | 8 | 2 |
| Lard+.06% d-isoascorbyl palmitate | 7 | 1 |
| Expected improvement to be obtained by adding both | | 3 |
| Lard+1% apple seed oil (crude)+.06% d-isoascorbyl palmitate | 15 | 9 |
| Improvement found when both are added together | | 9 |
| Synergistic effect (hours) | | 6 |

*Example II*

| Sample tested | Swift stability | Increase of stability |
|---|---|---|
| | Hours | Hours |
| Original lard | 7 | |
| Lard+1% corn oil (refined, edible) | 12 | 5 |
| Lard+.06% l-ascorbyl palmitate | 8 | 1 |
| Expected improvement to be obtained by adding both | | 6 |
| Lard+1% corn oil+.06% l-ascorbyl palmitate | 16 | 9 |
| Improvement found when both are added together | | 9 |
| Synergistic effect | | 3 |

*Example III*

| Sample tested | Swift stability | Increase of stability |
|---|---|---|
| | Hours | Hours |
| Original lard | 3 | |
| Lard+.06% d-isoascorbyl palmitate | 3 | 0 |
| Lard+½% wheat germ oil (refined) | 7 | 4 |
| Expected improvement to be obtained by adding both | | 4 |
| Lard+½% wheat germ oil+.06% d-isoascorbyl palmitate | 9 | |
| Improvement found when both are added together | | 6 |

Our invention is not limited to the specific examples set forth or the particular concentrations shown in the experimental data included in this application, but is applicable generally to the stabilization of any oleaginous material comprising glycerides or other esters of fat acids. Also, in the ternary antioxidant compositions, any ascorbyl monoester of fat acids may be used, alpha-tocopherol may be replaced by its isomers or analogues, and other phospholipids may be substituted for soybean phospholipids. Further, any vegetable oil, vegetable seed oil, or vegetable seed germ oil, containing naturally occurring antioxidants may be used as a source of tocopherols and phospholipids or other antioxidants capable of acting in a synergistic manner with ascorbyl monoesters of fat acids.

Having thus described our invention, we claim:

1. An antioxidant composition comprising an ascorbyl monoester of a saturated aliphatic monocarboxylic acid containing from 12 to 18 carbon atoms per molecule, a compound selected from the group consisting of alpha-tocopherol and the isomers and analogues of alpha-tocopherol, and phospholipids.

2. An antioxidant composition comprising an ascorbyl monoester of a saturated aliphatic monocarboxylic acid containing 12 to 18 carbon atoms per molecule, alpha-tocopherol, and soybean phospholipids.

3. An antioxidant composition comprising d-isoascorbyl monostearate, alpha-tocopherol and soybean phospholipids.

4. An antioxidant composition comprising an ascorbyl monoester of a saturated aliphatic monocarboxylic acid containing 12 to 18 carbon atoms per molecule and an oil containing naturally occurring antioxidants, said oil being selected from the group consisting of vegetable oils, vegetable seed oils and vegetable seed germ oils.

5. The method of inhibiting animal and vegetable fats and oils and other esters of fat acids against oxidative rancidity which comprises incorporating therewith an ascorbyl monoester of a saturated aliphatic monocarboxylic acid containing from 12 to 18 carbon atoms per molecule, a compound of the class consisting of alpha-tocopherol and the isomers and analogues of alpha-tocopherol, and phospholipids.

6. The method of inhibiting animal and vegetable fats and oils and other esters of fat acids against oxidative rancidity which comprises incorporating therewith an ascorbyl monoester of a saturated aliphatic monocarboxylic acid containing from 12 to 18 carbon atoms per molecule, alpha-tocopherol, and soybean phospholipids.

7. The method of inhibiting animal and vegetable fats and oils and other esters of fat acids against oxidative rancidity which comprises incorporating therewith an ascorbyl monoester of a saturated aliphatic monocarboxylic acid containing from 12 to 18 carbon atoms per molecule, and an oil containing naturally occurring antioxidants, said oil being selected from the group consisting of vegetable oils, vegetable seed oils and vegetable seed germ oils.

8. An oleaginous composition comprising esters of fat acids, having incorporated therein in an amount sufficient to inhibit the development of oxidative rancidity an ascorbyl monoester of a saturated aliphatic monocarboxylic acid containging 12 to 18 carbon atoms per molecule, a compound of the group consisting of alpha-tocopherol and the isomers and analogues of alpha-tocopherol, and phospholipids.

9. An oleaginous composition comprising esters of fat acids, having incorporated therein in an amount sufficient to inhibit the development of oxidative rancidity an ascorbyl monoester of a saturated aliphatic monocarboxylic acid containing 12 to 18 carbon atoms per molecule, alpha-tocopherol, and soybean phospholipids.

10. An oleaginous composition comprising esters of fat acids, having incorporated therein in an amount sufficient to inhibit the development of oxidative rancidity an ascorbyl monoester of a saturated aliphatic monocarboxylic acid containing 12 to 18 carbon atoms per molecule and an oil containing naturally occurring antioxidants, said oil being selected from the group consisting of vegetable oils, vegetable seed oils and vegetable seed germ oils.

ROY W. RIEMENSCHNEIDER.
JACK TURER.